R. ELCOCK.
COMBINATION LOCK.
APPLICATION FILED OCT. 1, 1919.
1,405,987.
Patented Feb. 7, 1922.
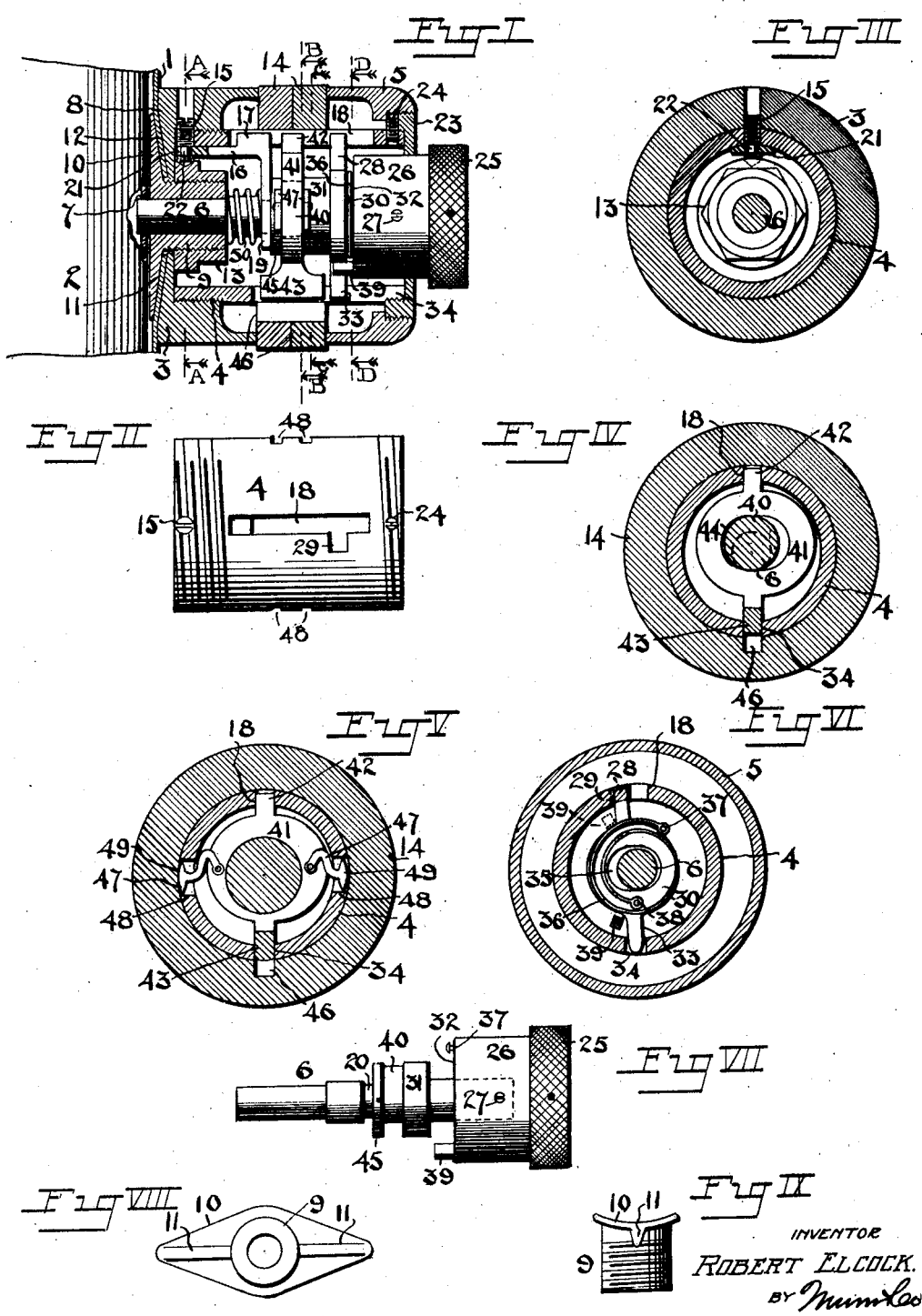
INVENTOR
ROBERT ELCOCK.
BY
ATTORNEYS.

UNITED STATES PATENT OFFICE.

ROBERT ELCOCK, OF JOHANNESBURG, TRANSVAAL, SOUTH AFRICA.

COMBINATION LOCK.

1,405,987. Specification of Letters Patent. Patented Feb. 7, 1922.

Application filed October 1, 1919. Serial No. 327,735.

*To all whom it may concern:*

Be it known that ROBERT ELCOCK, a British subject, of Victoria Mansions, Eloff Street, Johannesburg, Transvaal Province of the Union of South Africa, has invented certain new and useful Improvements in Combination Locks, of which the following is a specification.

The present invention relates to combination locks, in which movement of the bolt is dependent upon a prescribed positioning of rotatable letter rings or equivalent movable members.

An object of the invention is to ensure that no opening movement of the bolt can occur until the gates of all the movable elements are alined and thus prevent the position of the gates being felt individually by slight yieldings of the bolt.

A further object is to cause withdrawing movement of the bolt to lock the rings, so preventing simultaneous movement of the rings and the bolt in order to find the gates.

Another object is to enable the bolt to be shot without the necessity of positioning the letter rings.

Another object is to provide a permutation lock constructed for locking the steering column of a motor car or cycle.

In the accompanying drawings:

Fig. I shows a cycle or car lock partly in longitudinal section.

Fig. II is a plan of the tube hereafter referred to.

Fig. III is a section on line A, A Fig. I.
Fig. IV is a section on line B B Fig. I.
Fig. V is a section on line C C Fig. I.
Fig. VI is a section on line D D Fig. I.
Fig. VII shows the bolt detached.
Fig. VIII is an end view of the bolt which secures the lock to the column, and
Fig. IX is a plan of the same.

1 indicates the steering column and 2 the steering post rotatable within the same. The lock casing 3, 4, 5 is fixed to the outside of the column and provides a bolt 6 which slides through the wall of the column 1 and into a hole 7 in the steering post 2 to lock said column and spindle together.

The casing comprises a seating 3 which is hollowed at 8 to fit the column 1 and is held thereto by a bolt 9. Said bolt has a T head 10 provided underneath with fins 11 to press the metal of the column 1 into grooves 12 formed in the face 8 of the seating 3. The bolt 9 is hollow to allow the bolt 6 to pass and is secured by a nut 13.

Screwed into the seating 3 is a tube 4 within which the bolt 6 and its concomitant parts move and upon the outside of which are rotatably mounted rings 14 which control the operation of the lock. The tube 4 is locked in the seating 3 by a set-screw 15 which also passes into and locks the nut 13. The set screw 15 itself is locked when the bolt 6 is shot, by a keeper 16 which is guided by a wing 17 passing into a longitudinal slot 18 in the tube 4, and is attached to the bolt 6 to slide therewith by its forked end 19 fitting into an annular recess 20 (Fig. VII) in the bolt 6. The other end 21 of the keeper 16 is also forked and, when the bolt 6 is shot, passes into an annular groove 22 in the set-screw 15. Owing to the wedge shape (as seen in Fig. III) of the forked end 21 of the keeper, any attempt to withdraw the set screw 15 whilst it is engaged by said end 21 results in the sections of said end being forced more closely into engagement with the set-screw 15.

At the forward end, the tube 4 is closed by a cap 23 screwed on from the front and locked by a set screw 24. Outside of said cap 23 is a further casing element 5, screwed on to the cap from the rear. The bolt 6 is actuated by a projecting milled head 25 removably fitted to a boss 26 which latter is secured to the bolt proper as by a set screw 27.

In assembling the lock, the seating 3 is secured to the column 1 by the hollow bolt 9 and the nut 13. The bolt 6 and the parts attached to it are fitted within the tube 4 after which the cap 23 is screwed on to the tube from the front and locked by its set screw 24. The milled head 25 can then be secured to the bolt 6. The part 5 is then screwed onto the cap 23 from the back, and the rings 14 slipped onto the outside of the tube 4. Finally the tube 4 is screwed into the seating 3 and the set screw 15 is driven home.

The bolt 6 is locked in its shot position by a spring ward 28 lying in a lateral slot 29 cut in the side of the longitudinal slot 18 in the tube 4. In order to release the bolt 6 said ward 28 has to be swung out of the slot 29 by rotation of the bolt 6, and such rotation of the bolt 6 is prevented by the letter rings 14 unless said rings are properly positioned.

The ward 28 is formed on a disc 30 which is held between a collar 31 on the bolt and the rear face 32 of the boss 26. It is free to swing laterally about a pivoting pin 33 which seats in a longitudinal slot 34 in the tube 4 opposite to the slot 18, the central hole 35 in the disc through which the bolt 6 passes being elongated to allow such movement.

Referring more particularly to Fig. VI, 36 is a spiral spring which is wound in the direction shown and is attached at one end to a pin 37 (Fig. VII) on the face 32 of the boss 26. The other end 38 of the spring is attached to the disc 30 and so meets and is joined to the same that in tending to straighten itself it cants the disc 30 about the pivot to the left in Fig. VI, that is into the slot 29. The straightening tendency of the spring 36 also tends to rotate the bolt 6 about the axis of the latter in a counterclockwise direction (Fig. VI), and this tendency is limited by a finger 39 projecting from the boss 26 and engaging the pivot pin 33. In order to release the ward 28 from the slot 29 and so release the bolt 6, the bolt is turned against the spring 36 to cause the finger 39 to engage the ward 28 as indicated by the dotted lines in Fig. VI and cant the disc 30 to the right. It will be seen that the single spring 36 serves both to retain the ward 28 in the slot 29 and to retain the bolt 6 in its counterclockwise retracted position.

On the bolt 6 is formed an eccentric 40. A follower 41 (Figs. I and IV) is formed with a wing 42 engaging the tube slot 18 and an opposite wing 43 engaging the tube slot 34. Said follower is thus constrained to move transversely to the axis of the bolt 6. The follower 41 is formed with a laterally extended slot 44 to pass over and engage the eccentric 40; and it is held on the eccentric by a collar 45. In the letter rings 14 are provided the usual gates 46.

On the follower 41 are pivoted toggle links 47. Said toggle links extend through apertures 48 in the casing tube 4 for engagement with the inner surface of the letter rings 14. The ends 49 of said toggle links are made of greater width than gates 46 in the rings 14, so that said ends are prevented from slipping into said gates.

When the bolt 6 is in its normal position of rest, with the finger 39 resting on the pivot 33, the eccentric 40 is in its upward position, the follower 41 at the top of its travel, the wing 43 resting on the inner surfaces of all the rings 14, so preventing rotation of the bolt 6. Upon the gates of the rings being alined as shown in Fig. I, the follower is free to move down and permits the bolt 6 to rotate. Upon rotating the bolt in a clockwise direction (Figs. IV and VI) the finger 39 shifts the ward 28 out of the slot 29 leaving the bolt 6 and all its attached parts free to move outwardly. A compression spring 50 is usually fitted for so moving it. The bolt 6 is thus withdrawn from the post 2, leaving the latter free to turn. The fork 21 of the keeper 16 is also withdrawn from the set screw 15, so enabling the latter to be withdrawn if it is desired to disassemble the lock. Considerable play is allowed between the finger 39 and the ward 28 so that said ward is not released until the final rotational movement of the bolt 6 and after there has been sufficient of said rotational movement fully to actuate the follower 41.

Upon the bolt head 25 being released the bolt is swung back by the spring 36 until stopped by the finger 39 coming into contact with the pivot pin 33. This rotational movement raises the wing 43 out of the ring gates 46, so that the bolt can be relocked by simply pressing it inwards without the rings 14 being specially positioned.

If the bolt 6 is turned when the ring gates 46 are not in the position of Fig. I, the wing 43 presses on the interior of the rings 14, and as the eccentric 40 is then near its upper dead centre this pressure may be considerable. The effect is to hinder free rotation of the rings 14 and so make it difficult to search for the gates 46 by rotating the rings 14 and at the same time exerting torque on the bolt 6. This effect is accentuated by the toggle links 47 which are so adjusted that upon a slight downward movement of the follower 41, they come near to their dead centre position, and thus exert such outward thrust on the rings 14 as to lock the latter against movement. These toggles are bent as shown in Fig. V to make them somewhat springy so that they can yield sufficiently to pass over their dead centres upon the follower 41 passing into the rings 14 thus allowing the follower 41 to move freely for the remainder of its movement. This spring construction is also of value in taking up wear at the free ends of the toggle links.

I claim:

1. In a combination lock, a fixed casing, a bolt slidable therein, said bolt being also rotatable therein, interengaging means on the bolt and casing to hold the bolt in its shot position against sliding movement and disconnectible by rotation of the bolt, and movable combination elements controlling rotational movement of the bolt.

2. In a combination lock, a fixed casing, a bolt slidable therein, said bolt also being rotatable in the casing, a ward carried by the bolt and engaging by rotational movement a slot in the casing, spring means tending to hold said ward in said slot, and movable combination elements controlling rotational movement of the bolt.

3. In a combination lock, a fixed casing, a bolt slidable therein, said bolt being also rotatable in the casing, a ward carrying element mounted on the bolt so as to be fixed as regards longitudinal movement relative to the bolt but free to rotate relatively thereto, inter-engaging rotational driving means between the bolt and the ward carrying element, said driving means permitting substantial initial rotation of the bolt free of the ward carrying element, and combination elements controlling rotation of the bolt.

4. In a combination lock, a rotatable bolt, a cam on the bolt, a movable member actuated by said cam upon rotation of the bolt, and movable combination elements controlling the movement of the cam actuated member.

5. In a combination lock, a movable bolt, movable combination elements controlling movement of the bolt, and means operating by movement of the bolt to lock the combination elements.

6. In a combination lock, a movable bolt, movable combination elements controlling movement of the bolt, and toggle means operated by movement of the bolt to lock the combination elements.

7. In a combination lock, a movable bolt, movable combination elements controlling movement of the bolt, a laterally movable element constrained to move with the bolt, and toggle means connecting the said laterally movable element and engageable with the combination elements by lateral movement of said laterally movable member.

8. In a combination lock, a rotatable bolt, a member guided for movement laterally to the bolt and so moved by rotation of the bolt, rotatable combination elements around the said member and toggle arms projecting from said member to engage the combination elements interiorly.

9. In a steering lock, the combination with a tubular member, of a lock casing applied to the exterior thereof, said casing providing a seating surface shaped to fit the exterior of the tubular member, and also grooved, a bolt having a T head seating on the interior of the tubular member, and providing fins adapted to force the metal of the tubular member into the seating grooves, and a nut on the bolt within the lock casing.

10. In a steering lock, the combination with a tubular member of a lock casing seated exteriorly thereon, a bolt passing through the tubular member and having a head seating interiorly therein, complementary formations on the bolt head and the lock casing for deforming metal of the tubular member into engagement with the lock casing, and a nut securing the bolt and itself enclosed by the lock casing.

11. In a lock, the combination of a casing, a bolt for securing the said casing to a fixture and extending into the casing, said casing being made in parts, a nut on the bolt for securing the same, and a set screw which locks the casing parts together and also locks said nut.

12. In a lock, a casing composed of different parts, a set screw serving to lock all of said parts together, a movable bolt in the lock, a keeper movable with said bolt, said keeper, when the bolt is shot, engaging said set screw to lock it against movement.

13. In a lock, the combination of a tubular casing element enclosing the bolt, a casing element screwed on to said tubular element from the rear end thereof, rotatable rings on the tubular element, a seating element into which said tubular element is screwed rearwardly and means for locking said tubular element to said seating element.

14. In a lock, the combination of a tubular casing element, bolt means insertable into said tubular element from the front of the same, a bolt retaining element screwed on to said tubular element from the front, means locking said retaining element on the tubular element, a casing element screwed on to said rotating element from the rear and shielding said locking means, a seating element into which the tubular element is screwed rearwardly, means for locking said tubular element in said seating element, and means actuated by the bolt for locking said last named locking means.

In testimony whereof I affix my signature.
ROBERT ELCOCK.